United States Patent
Kurahashi

(10) Patent No.: US 11,728,892 B2
(45) Date of Patent: Aug. 15, 2023

(54) RE-MODULATION DEVICE, DEMODULATION RECEPTION DEVICE, MODULATION TRANSMISSION DEVICE, MODULATION COMMUNICATION SYSTEM, RE-MODULATION METHOD, AND RECORDING MEDIUM

(71) Applicant: NEC Corporation, Tokyo (JP)

(72) Inventor: Ryu Kurahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/626,218

(22) PCT Filed: Jun. 8, 2020

(86) PCT No.: PCT/JP2020/022539
§ 371 (c)(1),
(2) Date: Jan. 11, 2022

(87) PCT Pub. No.: WO2021/019915
PCT Pub. Date: Feb. 4, 2021

(65) Prior Publication Data
US 2022/0376792 A1 Nov. 24, 2022

(30) Foreign Application Priority Data
Jul. 29, 2019 (JP) .................................. 2019-138564

(51) Int. Cl.
*H04B 10/299* (2013.01)
*H04B 10/2507* (2013.01)
*H04B 10/54* (2013.01)

(52) U.S. Cl.
CPC ....... *H04B 10/299* (2013.01); *H04B 10/2507* (2013.01); *H04B 10/541* (2013.01)

(58) Field of Classification Search
CPC . H04B 10/299; H04B 10/2507; H04B 10/541
USPC ............................................................ 398/175
See application file for complete search history.

(56) References Cited

U.S. PATENT DOCUMENTS 5,745,274 A   4/1998   Fatehi et al.
5,768,011 A   6/1998   Amagi et al.
(Continued)

FOREIGN PATENT DOCUMENTS

EP   1357686 A1 *  10/2003  ......... H04B 10/2557
EP   1524785 A1 *   4/2005  ............. H01S 3/302
(Continued)

OTHER PUBLICATIONS

Zhang et al; Simultaneous generation of independent wired and 60-GHz wireless signals in an integrated WDM-PON-RoF system based on frequency sextupling and OCS-DPSK modulation; Jun. 2012; Optics Express; pp. 1-8. (Year: 2012).*

(Continued)

*Primary Examiner* — Amritbir K Sandhu

(57) ABSTRACT

In order to make a communicable distance in an optical cable of an optical signal which is subjected to amplitude modulation longer, a re-modulation device is provided with: an acquisition unit that acquires, from a first modulation optical signal obtained by performing first amplitude modulation on an optical signal with second data sent from a modulation transmission device to a demodulation reception device, the second data; and a re-modulation unit that, when determining passing of the first modulation optical signal, sends, to the demodulation reception device, a second modulation optical signal obtained by performing second amplitude modulation on the inputted optical signal with the second data.

12 Claims, 8 Drawing Sheets

(56) References Cited

U.S. PATENT DOCUMENTS

| | | | | |
|---|---|---|---|---|
| 6,075,633 A * | 6/2000 | Deguchi | .............. | H04B 10/298 |
| | | | | 398/1 |
| 6,144,708 A * | 11/2000 | Maruyama | ............. | H03D 3/009 |
| | | | | 375/373 |
| 6,574,016 B1 | 6/2003 | Harley et al. | | |
| 8,243,363 B2 * | 8/2012 | Watanabe | ............ | H04B 10/299 |
| | | | | 359/341.1 |
| 2009/0324257 A1 * | 12/2009 | Murakami | .......... | H04J 14/0221 |
| | | | | 398/200 |
| 2020/0266912 A1 * | 8/2020 | Abe | ................... | H04B 10/0773 |

FOREIGN PATENT DOCUMENTS

| | | | |
|---|---|---|---|
| JP | H08-265259 A | 10/1996 | |
| JP | H09-186658 A | 7/1997 | |
| JP | H10-224306 A | 8/1998 | |
| JP | 2000-165357 A | 6/2000 | |
| JP | 2006-313782 A | 11/2006 | |

OTHER PUBLICATIONS

Zhang et al; Simultaneous generation of independent wired and 60-GHz wireless signals in an integrated WDM-PON-RoF system based on frequency sextupling and OCS-DPSK modulation; Jun. 2012; Optics Express; 1-8. (Year: 2012).*

International Search Report for PCT Application No. PCT/JP2020/022539, dated Jul. 21, 2020.

English translation of Written opinion tor PCT Application No. PCT/JP2020/022539, dated Jul. 21, 2020.

\* cited by examiner

RE-MODULATION DEVICE, DEMODULATION RECEPTION DEVICE, MODULATION TRANSMISSION DEVICE, MODULATION COMMUNICATION SYSTEM, RE-MODULATION METHOD, AND RECORDING MEDIUM

This application is a National Stage Entry of PCT/JP2020/022539 filed on Jun. 8, 2020, which claims priority from Japanese Patent Application 2019-138564 filed on Jul. 29, 2019, the contents of all of which are incorporated herein by reference, in their entirety.

TECHNICAL FIELD

The present invention relates to a method of modulating an optical signal.

BACKGROUND ART

A part of an optical transmission device constituting a submarine optical cable communication system such as an optical branch device (ROADM) may not have inside a light source for generating a transmission optical signal. Herein, ROADM is an abbreviation of reconfigurable optical add/drop multiplexer. In this case, the device may amplitude-modulate an output level of excitation laser of an optical amplifier such as an erbium-doped fiber amplifier (EDFA) during information transmission, and thereby transmit information by amplitude-modulating a received optical signal.

FIG. 1 is a conceptual diagram illustrating a configuration of an optical communication system 900 being an example of a general optical communication system including a modulation communication system that transmits a received optical signal by amplitude modulation.

The optical communication system 900 includes a transmission device 600, a modulation communication system 500, and a reception device 700.

The transmission device 600 is a device that transmits a data optical signal to the reception device 700 via optical cables 901, 902, and 904. The reception device 700 is a device that receives the data optical signal.

The modulation communication system 500 includes a modulation transmission device 100 and a demodulation reception device 300.

The modulation transmission device 100 is a device that amplitude-modulates an optical signal L1 to be transmitted toward the reception device 700 by the transmission device 600, and thereby superimposes, on the optical signal L1, another piece of information toward the demodulation reception device 300.

The optical signal L1 being a data optical signal is input to the modulation transmission device 100 from the transmission device 600 via the optical cable 901. Amplitude of optical intensity in the optical signal L1 is approximately constant. The optical signal L1 is, for example, an optical signal in which data (hereinafter, referred to as "first data") are represented by a low level and a high level. The first data are supposed to be received by the reception device 700. The optical signal L1 is, for example, a multiplex optical signal representing data in which a plurality of pieces of data being switched to a low level and a high level at different frequencies overlap.

The optical cable 901 may be a land optical cable or a submarine optical cable. It is assumed that an "optical cable" in the present description may include, in addition to a cable-shaped part, an optical device such as an optical repeater or an optical branch device, which is connected between cable-shaped parts. The cable-shaped part typically includes a plurality of optical cables, and an armor part bundling the optical cables. A case may be also supposed where the number of core wires of the optical fiber is plural.

The modulation transmission device 100 amplitude-modulates the optical signal L1 by held data for modulation transmission (hereinafter, referred to as "second data"), thereby generates a first modulation optical signal in which the second data are superimposed on the optical signal L1, and sends the first modulation optical signal to the optical cable 902.

When an optical signal L2 is an amplitude-modulated modulation optical signal, the demodulation reception device 300 acquires the second data by demodulating the modulation optical signal.

In the optical communication system 900, sending of the first data from the transmission device 600 to the reception device 700, and sending of the second data from the modulation transmission device 100 to the demodulation reception device 300 can be performed by the above.

Herein, PTL 1 discloses a submarine modulation station including a multiplexing means for modulating demultiplexed signal light by monitor data, and guiding, to an optical fiber cable, the signal light being output from a modulator that adjusts in such a way that average intensity of signal light to be output is brought within a predetermined range.

PTL 2 discloses an optical amplification repeater provided with a modulation degree compensation means for maintaining, at an approximately constant degree, a modulation degree of a transfer signal to an optical output from a rare-earth-doped-fiber, regardless of a frequency of the transfer signal.

CITATION LIST

Patent Literature

[PTL 1] Japanese Unexamined Patent Application Publication No. 2006-313782
[PTL 2] Japanese Unexamined Patent Application Publication No. H08-265259

SUMMARY OF INVENTION

Technical Problem

It is understood by experience that a modulation degree of an optical signal L2 being a modulation optical signal that is amplitude-modulated by the modulation transmission device 100 illustrated in FIG. 1 is more decreased as a length of an optical cable 902 being a submarine optical cable is longer. This is considered to be because amplification by an optical repeater is needed when a length of the optical cable 902 is long, and a signal-to-noise ratio deteriorates due to the amplification. Although not illustrated in FIG. 1, an ROADM device may be cascade-connected to the optical cable 902 being a submarine optical cable. In this case, a modulation band may be lessened by add/drop ratio setting of the ROADM device or the like. A modulation degree of the optical signal L2 being input to a demodulation reception device 300 is decreased by a reduction of a modulation band as well.

In order to solve a problem of a modulation degree decrease of an optical signal passing through a submarine optical cable, considering a decrease in modulation degree and setting a great modulation degree during transmission is effective. However, it is generally known that overly increasing a modulation degree causes stability of optical communication to decrease. Therefore, there is a limit to a length of a submarine optical cable that can transmit the optical signal by such modulation as above.

An object of the present invention is to provide a re-modulation device and the like being capable of further elongating a communicable distance of an amplitude-modulated optical signal in an optical cable.

Solution to Problem

A re-modulation device according to the present invention includes: an acquisition unit that acquires second data being sent to a demodulation reception device by a modulation transmission device, from a first modulation optical signal derived by subjecting an optical signal to a first amplitude modulation by the second data; and a re-modulation unit that sends, to the demodulation reception device, a second modulation optical signal derived by subjecting the input optical signal to a second amplitude modulation by the second data, when determining passing of the first modulation optical signal.

Advantageous Effects of Invention

A re-modulation device and the like according to the present invention are capable of further elongating a communicable distance of an amplitude-modulated optical signal in an optical cable.

EXAMPLE EMBODIMENT

[Configuration and Operation]

Figure 1:
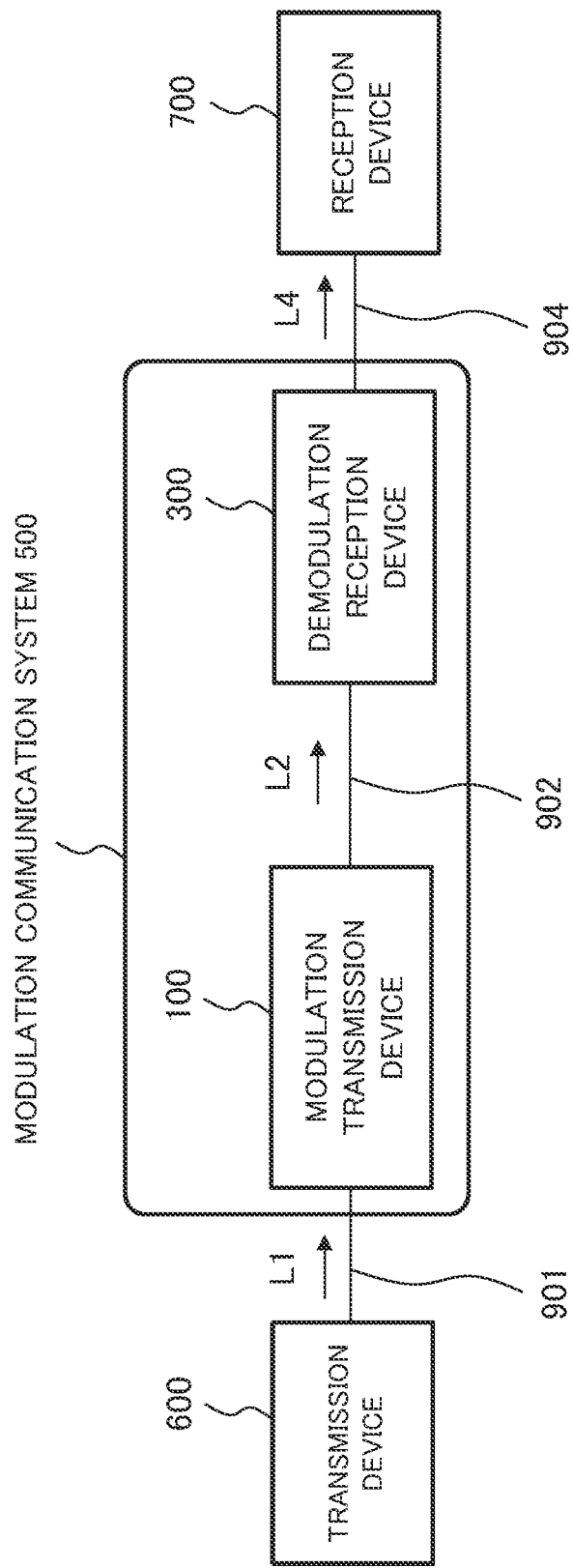
FIG. 1 is a conceptual diagram illustrating a configuration example of a general optical communication system including a modulation communication system.
Figure 2:
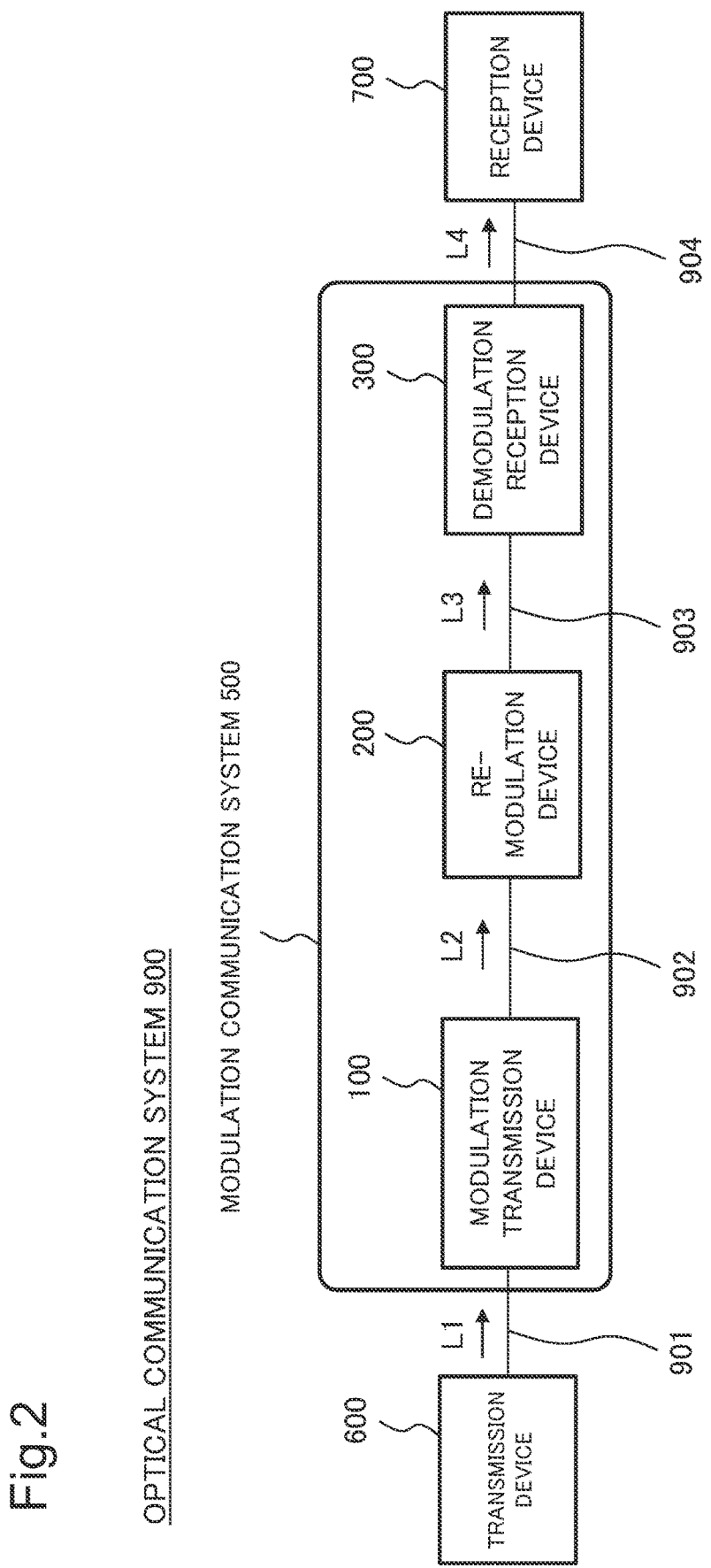
FIG. 2 is a conceptual diagram illustrating a configuration example of the optical communication system according to the present example embodiment.

FIG. 2 is a conceptual diagram illustrating a configuration of an optical communication system 900 being an example of an optical communication system according to the present example embodiment. The optical communication system 900 illustrated in FIG. 2 differs from an optical communication system 900 illustrated in FIG. 1 in that a re-modulation device 200 is placed between a modulation transmission device 100 and a demodulation reception device 300.

Description of the optical communication system 900 illustrated in FIG. 2 is the same as description of the optical communication system 900 illustrated in FIG. 1 except for the following. In a part of the following description, for ease of understanding, the description given regarding the optical communication system 900 illustrated in FIG. 1 is repeated.

The modulation transmission device 100 is a device that amplitude-modulates an optical signal L1 transmitted to a reception device 700 by a transmission device 600, and thereby superimposes, on the optical signal L1, another piece of information toward the demodulation reception device 300.

The optical signal L1 being a data optical signal is input to the modulation transmission device 100 from the transmission device 600 via the optical cable 901. The optical signal L1 is an optical signal switching in optical intensity according to data (hereinafter, referred to as "first data") at a high frequency and having a flat envelope. The first data are supposed to be received by the reception device 700. The optical signal L1 is, for example, a multiplex optical signal in which a plurality of optical signals being switched at differing frequencies overlap.

The optical cable 901 may be a land optical cable or a submarine optical cable. It is assumed that an "optical cable" in the example embodiment is capable of including a device such as a repeater or a branch device connected between cable-shaped parts, in addition to a cable-shaped part. The cable-shaped part typically includes a plurality of optical cables, and an armor part bundling the optical cables. A case is also supposable where the number of core wires of the optical fiber is plural.

The modulation transmission device 100 amplitude-modulates the optical signal L1 by held data for modulation transmission (hereinafter, referred to as "second data"), and thereby generates a first modulation optical signal in which second data and additional data being data added to the second data are superimposed on the optical signal L1.

The additional data are, for example, second data start data or second data end data. The second data start data are data representing start of the second data, and are added before the second data. The second data end data are data representing end of the second data, and are added after the second data.

Hereinafter, a combination of the second data and the additional data is referred to as "second data and the like".

The modulation transmission device 100 includes, for example, modulation count data representing a modulation count, in at least one of the second data start data and the second data end data. Herein, the modulation count is a count of amplitude modulations performed on an optical signal by second data. When the modulation transmission device 100 amplitude-modulates the optical signal L1 for the first time, a modulation count is 1.

The modulation transmission device 100 transmits, as an optical signal L2, the generated first modulation optical signal to the re-modulation device 200 through an optical cable 902. The optical cable 902 is, for example, a submarine optical cable.

The modulation transmission device 100 is a component included in, for example, a ROADM described in the paragraph of Background Art, but may be a component included in each of various other devices.

When a first modulation optical signal has arrived at the re-modulation device 200, a modulation degree of the first modulation optical signal is decreased by passing through the optical cable 902 in comparison with a modulation degree immediately after the first modulation optical signal is transmitted from the modulation transmission device 100. A modulation degree of an amplitude-modulated modulation optical signal is also stated in PTL 2, and is well known.

The re-modulation device 200 extracts, by branching, a part of the first modulation optical signal included in the arriving optical signal L2 and decreased in modulation degree, demodulates the extracted part, and thereby acquires second data and the like superimposed on the optical signal L2 by an amplitude modulation.

The re-modulation device 200 also performs processing of adding up, by one, a modulation count included in the additional data added to the second data included in the first modulation optical signal. The re-modulation device 200 generates a second modulation optical signal by the second data and the like including the additional data after the addition.

For example, when another re-modulation device is not included in the optical cable 902, a modulation count included in an arriving first modulation optical signal is only one (single) amplitude modulation by the modulation transmission device 100. In this case, the re-modulation device 200 sets a modulation count included in second data and the like to 2, and generates a second modulation optical signal by the second data and the like.

The re-modulation device 200 waits for the first modulation optical signal included in the optical signal L2 to pass and be sent as an optical signal L3, amplitude-modulates a non-amplitude-modulated part of the optical signal L2 by the second data and the like in which a modulation count is updated, and generates a second modulation optical signal. In this instance, the re-modulation device 200 sets in such a way that a modulation degree of a second modulation optical signal becomes higher than a modulation degree of an arriving first modulation optical signal. In this case, the re-modulation device 200 sets in such a way that a modulation degree of the second modulation optical signal becomes equal to, for example, a modulation degree of the first modulation optical signal immediately after being sent from the modulation transmission device 100 and before the modulation degree is decreased.

The second modulation optical signal is sent from the re-modulation device 200 to an optical cable 903 as the optical signal L3, later than sending of the first modulation optical signal decreased in modulation degree.

A case can be also supposed where a next first modulation optical signal arrives at the re-modulation device 200 as the optical signal L2 while the re-modulation device 200 amplitude-modulates a non-amplitude-modulated part of the optical signal L2 by second data and the like. In this case, the re-modulation device 200 stops the amplitude modulation according to the second data and the like. Thus, a second modulation optical signal that is only halfway amplitude-modulated by the second data and the like is sent to the optical cable 903.

When stopping the amplitude modulation of the optical signal L2 by the second data and the like, the re-modulation device 200 again performs an amplitude modulation of the non-amplitude-modulated optical signal L2 by stopped second data and the like.

The re-modulation device 200 may acquire a modulation degree of a first modulation optical signal, and generate and send a second modulation optical signal only when the modulation degree is less than a first threshold value.

The re-modulation device 200 is typically a component included in an optical repeater, but may be a component included in each of various other devices such as a gain equalizer.

The demodulation reception device 300 extracts a part of the optical signal L3 arriving via the optical cable 903. A remaining part of the optical signal L3 is sent to an optical cable 904 as an optical signal L4. The optical cable 904 may be a land optical cable or a submarine optical cable.

The demodulation reception device 300 acquires second data and the like by demodulating a modulation optical signal included in the extracted optical signal L3. In this instance, when a modulation optical signal is a modulation optical signal for which an amplitude modulation by the re-modulation device 200 is stopped halfway, the demodulation reception device 300 discards second data and the like related to the modulation optical signal. As previously described, for example, a fact that a modulation optical signal is a modulation optical signal for which an amplitude modulation is stopped halfway is determined by, for example, non-assignment of a modulation optical signal end information to the modulation optical signal.

The demodulation reception device 300 further performs determination regarding whether small-modulation-count second data and the like being second data and the like which include a modulation count smaller than a modulation count included in a modulation optical signal and in which second data are equal are acquired in the past. When small-modulation-count second data and the like acquired in the past are present, the demodulation reception device 300 discards the small-modulation-count second data.

A first modulation optical signal and a second modulation optical signal on which the same second data and the like are superimposed are mixed in a modulation optical signal arriving at the demodulation reception device 300, except when a modulation degree of the modulation optical signal is decreased extremely to an extent that it cannot be said to be a modulation optical signal. The demodulation reception device 300 prevents redundancy of second data to be held, by holding only second data and the like including the largest modulation count.

The demodulation reception device 300 is typically a component included in a land base station, but may be a component included in each of various other devices.

The optical signal L4 sent to the optical cable 904 is received by the reception device 700. The reception device 700 acquires, from the optical signal L4, first data sent toward the reception device 700 by the transmission device 600.

The optical cable 903 may include another re-modulation device being equivalent to the re-modulation device 200. Further, the another re-modulation device may be a plurality of re-modulation devices. In these cases, the re-modulation devices each perform processing similar to that of the re-modulation device 200 regarding a modulation optical signal included in an input optical signal. However, each of the re-modulation devices performs an amplitude modulation by acquired second data and the like, on an input optical signal for which a modulation optical signal is generated neither by a modulation transmission device nor by any of re-modulation devices at a stage previous to the re-modulation device.

Figure 3:
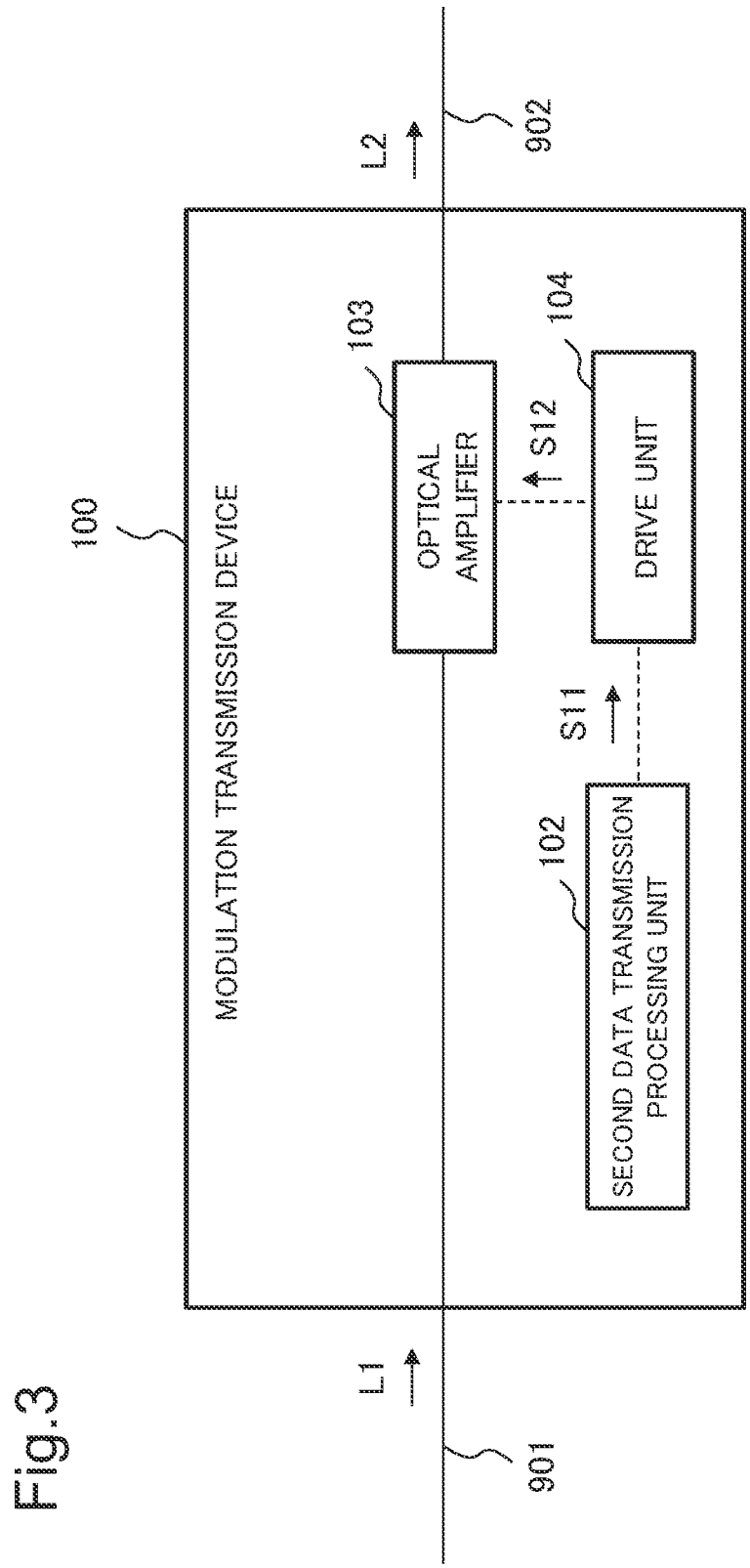
FIG. 3 is a conceptual diagram illustrating a configuration example of a modulation transmission device.

FIG. 3 is a conceptual diagram illustrating a configuration example of the modulation transmission device 100 illustrated in FIG. 2. For example, as illustrated in FIG. 3, the modulation transmission device 100 includes a second data transmission processing unit 102, an optical amplifier 103, and a drive unit 104.

The second data transmission processing unit 102 is configured to include, for example, a computer such as a processor. The second data transmission processing unit 102 generates second data and the like that are sent by the modulation transmission device 100 toward the demodulation reception device 300 illustrated in FIG. 2, and sends the second data and the like to the drive unit 104 as a signal S11. The second data transmission processing unit 102 generates the second data and the like, based on, for example, information input from outside of a sensor or the like.

The drive unit 104 generates, by the second data and the like sent from the second data transmission processing unit 102, a signal S12 for driving an excitation laser dioxide of the optical amplifier 103, and sends the signal S12 to the optical amplifier 103.

The optical amplifier 103 is, for example, an EDFA described in the paragraph of Background Art. The optical amplifier 103 generates the previously described first modulation optical signal by changing intensity of the optical signal L1 sent from the transmission device 600 illustrated in FIG. 2 via the optical cable 901 and performing an amplitude modulation. The first modulation optical signal is sent out, as the optical signal L2, to the optical cable 902, toward the re-modulation device 200 illustrated in FIG. 2 via the optical cable 902.

Figure 4:
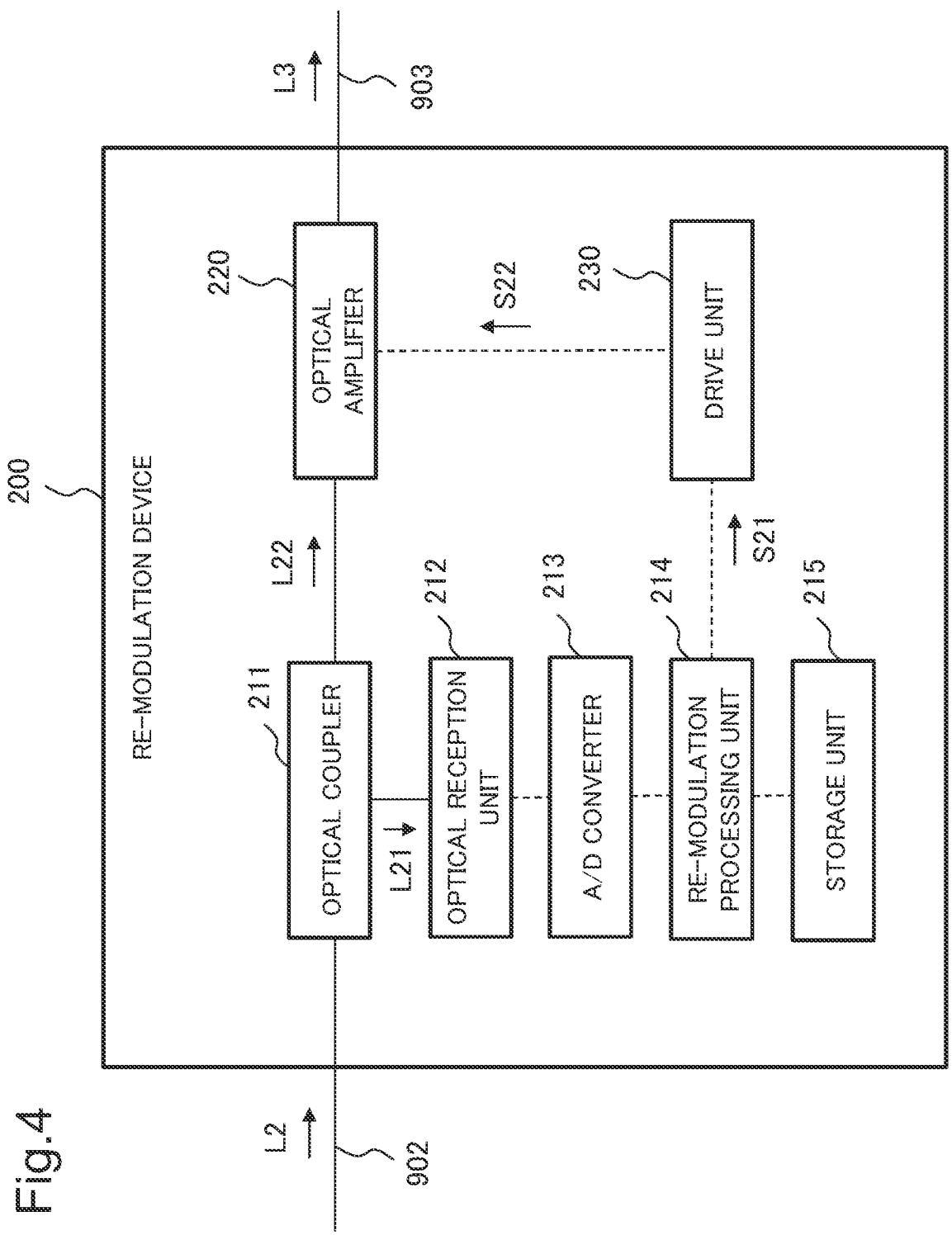
FIG. 4 is a conceptual diagram illustrating a configuration example of a re-modulation device.

FIG. 4 is a conceptual diagram illustrating a configuration example of the re-modulation device 200 illustrated in FIG. 2. For example, as illustrated in FIG. 4, the re-modulation device 200 includes an optical coupler 211, an optical reception unit 212, an A/D converter 213, a re-modulation processing unit 214, a storage unit 215, an optical amplifier 220, and a drive unit 230. Herein, A/D is an abbreviation of analog/digital.

The optical coupler 211 extracts, as an optical signal L21 by branching, a part of the optical signal L2 arriving via the optical cable 902, and inputs the optical signal L21 to the optical reception unit 212. The optical coupler 211 inputs another part of the optical signal L2 to the optical amplifier 220 as an optical signal L22.

The optical reception unit 212 converts the input optical signal L21 into an electric signal, and inputs the electric signal to the A/D converter 213.

The A/D converter 213 converts the input analog electric signal into a digital electric signal, and inputs the digital electric signal to the re-modulation processing unit 214.

The re-modulation processing unit 214 acquires, from the input digital electric signal, the previously described second data and the like sent toward the demodulation reception device 300 by the modulation transmission device 100 illustrated in FIG. 2. The re-modulation processing unit 214 stores the acquired second data and the like in the storage unit 215.

The re-modulation processing unit 214 further updates the previously described modulation count data included in the acquired second data and the like. The update is processing of increasing a modulation count by one as previously described. The re-modulation processing unit 214 stores the second data and the like after the update in the storage unit 215.

The re-modulation processing unit 214 performs determination regarding whether passing of the first modulation optical signal is completed. The re-modulation processing unit 214 performs the determination of completion of the passing by determining, for example, acquisition completion of modulation optical signal end information included in the first modulation optical signal at an end. When determining that the first modulation optical signal has passed, the re-modulation processing unit 214 reads second data and the like which the drive unit 230 is caused to store in the storage unit 215, and for which modulation count data are updated, and sends the second data and the like to the drive unit 230 as a signal S21. The re-modulation processing unit 214 determines passing of the first modulation optical signal and then sends the second data and the like to the drive unit 230, in order to cause the optical amplifier 220 to perform an amplitude modulation by the second data and the like on the non-amplitude-modulated optical signal L2. Given that the amplitude-modulated optical signal L1 is further amplitude-modulated, a generated modulation optical signal becomes a modulation optical signal that is not able to be demodulated in the demodulation reception device 300 illustrated in FIG. 2. This is why it is necessary to cause the optical amplifier 220 to perform an amplitude modulation by second data and the like on the non-amplitude-modulated optical signal L2.

Even when an amplitude modulation by second data and the like is started for the non-amplitude-modulated optical signal L2, a next first modulation optical signal may arrive as the optical signal L2 during the amplitude modulation. In this case, the re-modulation processing unit 214 stops the amplitude modulation performed halfway. When the amplitude modulation is stopped, the re-modulation processing unit 214 again performs an amplitude modulation on the non-amplitude-modulated optical signal L2 by second data and the like related to the stopped amplitude modulation.

The drive unit 230 generates, by the signal S21 sent from the re-modulation processing unit 214, a signal S22 for driving amplification of the optical amplifier 220, and sends the signal S22 to the optical amplifier 220.

The optical amplifier 220 is, for example, an EDFA described in the paragraph of Background Art. The optical amplifier 220 changes an amplification rate when amplifying the optical signal L22 according to the signal S22 sent from the drive unit 230, amplitude-modulates the optical signal L22, and thereby superimposes second data and the like on the optical signal L22. The optical amplifier 220 sends, as the optical signal L3, the second modulation optical signal on which the second data and the like are superimposed, toward the demodulation reception device 300 illustrated in FIG. 2, via the optical cable 903.

Figure 5:
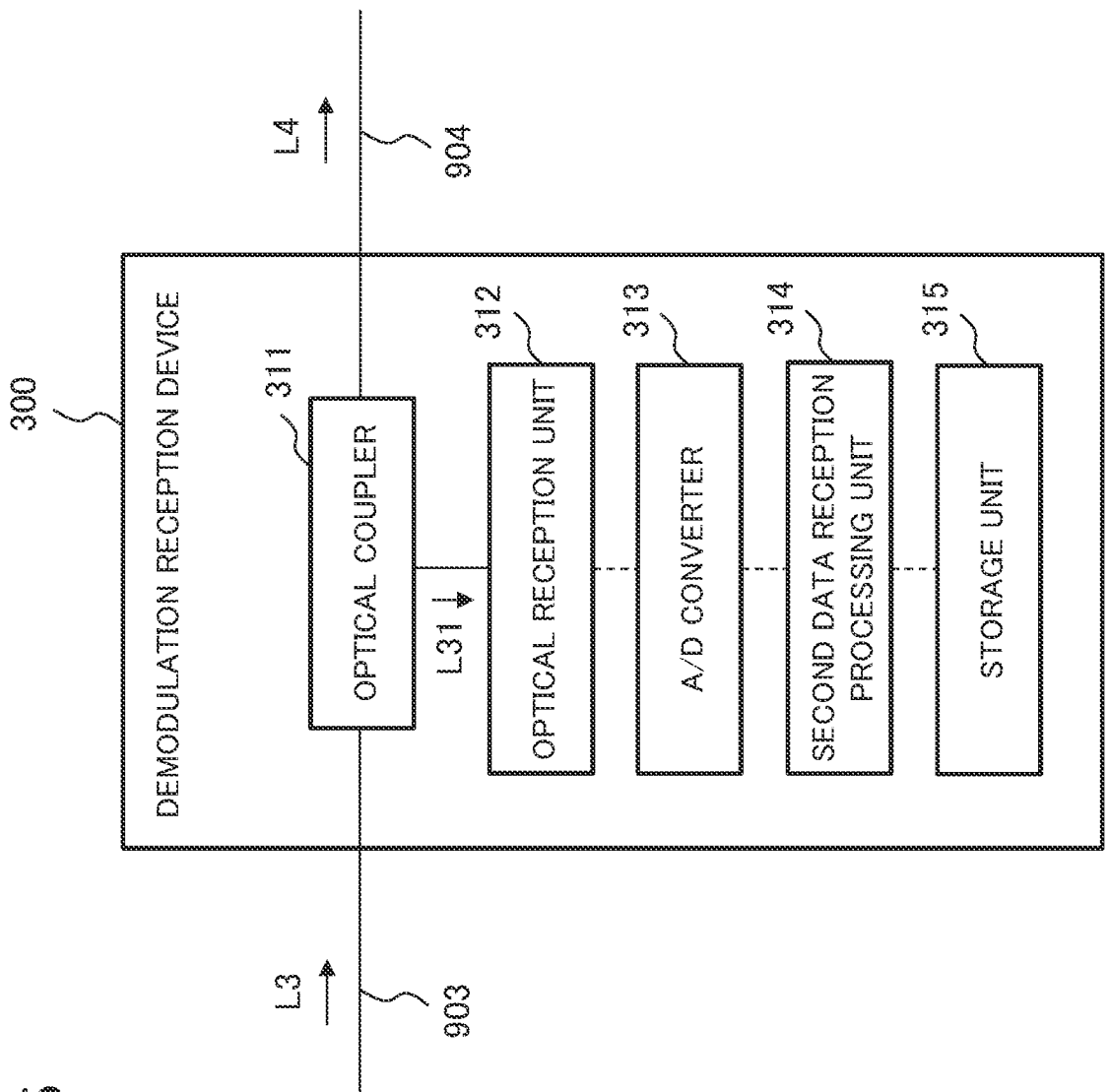
FIG. 5 is a conceptual diagram illustrating a configuration example of a demodulation reception device.

FIG. 5 is a conceptual diagram illustrating a configuration example of the demodulation reception device 300 illustrated in FIG. 2. For example, as illustrated in FIG. 5, the demodulation reception device 300 includes an optical coupler 311, an optical reception unit 312, an A/D converter 313, a second data reception processing unit 314, and a storage unit 315.

The optical coupler 311 extracts, as an optical signal L31 by branching, a part of the optical signal L3 arriving via the optical cable 903, and inputs the optical signal L31 to the optical reception unit 312. The optical coupler 311 sends, as the optical signal L4, another part of the optical signal L3 toward the reception device 700 illustrated in FIG. 2 via the optical cable 904.

The optical reception unit 312 converts the input optical signal L31 into an electric signal, and inputs the electric signal to the A/D converter 313.

The A/D converter 313 converts the input analog electric signal into a digital electric signal, and inputs the digital electric signal to the second data reception processing unit 314.

The second data reception processing unit 314 performs demodulation processing related to an amplitude modulation regarding the input digital electric signal, and acquires the previously described second data and the like transmitted toward the demodulation reception device 300 by the modulation transmission device 100 illustrated in FIG. 2. The second data reception processing unit 314 stores the acquired second data and the like in the storage unit 315.

When modulation optical signal end information for a modulation optical signal is absent, the second data reception processing unit 314 causes the storage unit 315 to discard second data and the like acquired from the modulation optical signal. Thus, the second data reception processing unit 314 discards the second data and the like acquired from the modulation optical signal for which an amplitude modulation by the re-modulation device 200 illustrated in FIG. 2 has been stopped halfway.

The second data reception processing unit 314 performs determination regarding whether the storage unit 315 holds the previously described small-modulation-count second data and the like being second data and the like in which the previously described modulation count included in second data and the like is smaller than the second data and second data are equal. When small-modulation-count second data and the like are stored in the past, the second data reception processing unit 314 causes the storage unit 315 to delete the small-modulation-count second data and the like.

Figure 6:
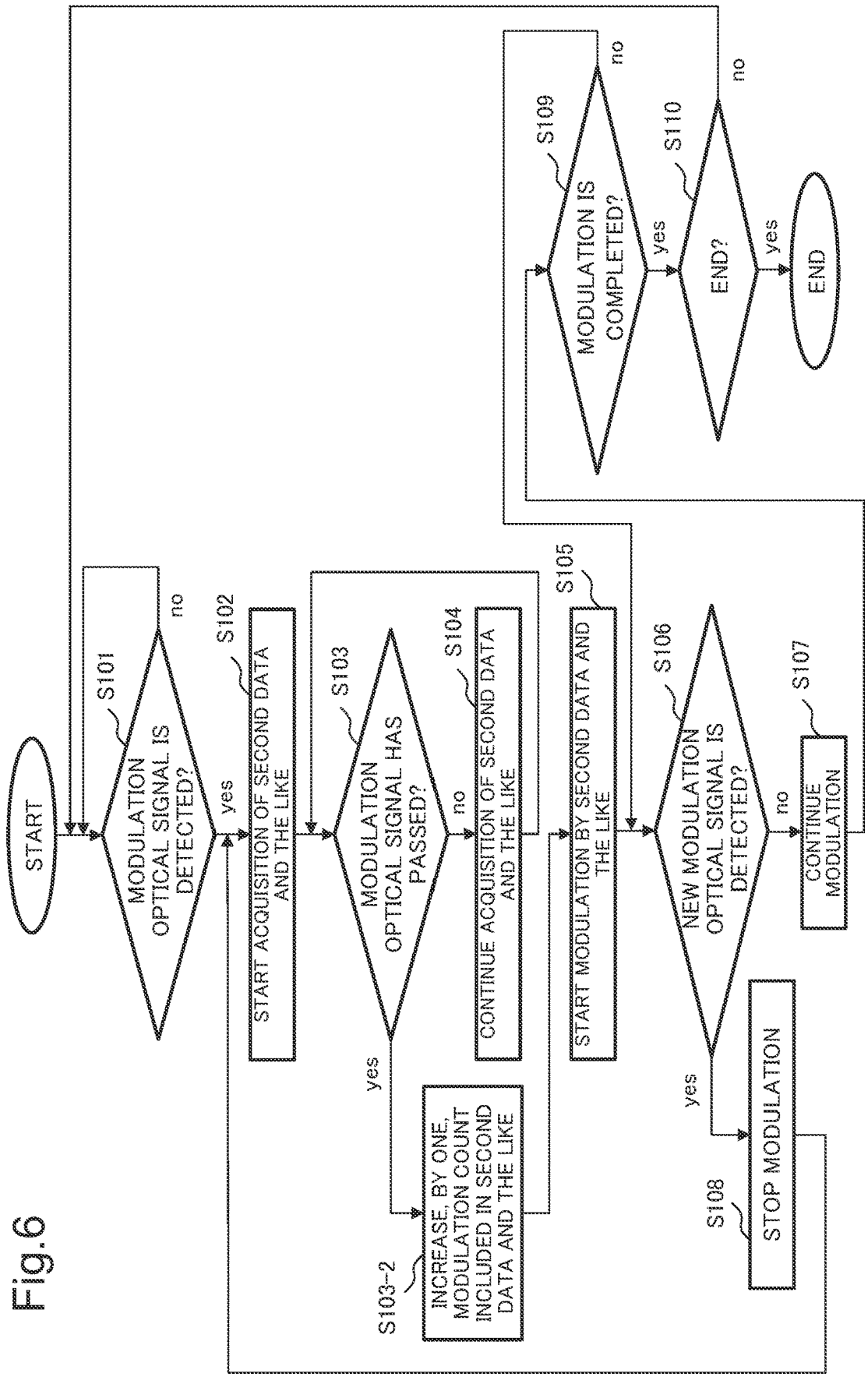
FIG. 6 is a conceptual diagram illustrating a processing flow example of processing performed by a re-modulation processing unit.

FIG. 6 is a conceptual diagram illustrating a processing flow example of processing performed by the re-modulation processing unit 214 illustrated in FIG. 4.

The re-modulation processing unit 214 starts processing illustrated in FIG. 6 by, for example, input of start information from outside.

In this case, the re-modulation processing unit 214 first performs, as processing in S101, determination regarding whether a modulation optical signal is detected. The re-modulation processing unit 214 monitors a fluctuation of amplitude of the optical signal L2 within a most recent predetermined period, and detects that the optical signal L2 is a modulation optical signal when the fluctuation is present.

When a determination result by the processing in S101 is no, the re-modulation processing unit 214 again performs the processing in S101, and waits for the determination result to become yes.

When a modulation optical signal arrives, and a determination result by the processing in S101 becomes yes, the re-modulation processing unit 214 starts acquisition of second data and the like from the modulation optical signal by demodulation of the modulation optical signal, as processing in S102. The re-modulation processing unit 214 causes the storage unit 215 illustrated in FIG. 4 to sequentially store the acquired second data and the like.

The re-modulation processing unit 214 performs, as processing in S103, determination regarding whether the modulation optical signal has passed.

When a determination result by the processing in S103 is no, the re-modulation processing unit 214 continues acquisition of second data and the like from the modulation optical signal as processing in S105, and again performs the processing in S103.

Thus, when the modulation optical signal passes as a result of repetition of the processing in each of S103 and S104 by the re-modulation processing unit 214, a determination result of the processing in S103 becomes yes.

In this case, as processing in S103-2, the re-modulation processing unit 214 increases, by one, the previously described modulation count included in the second data and the like acquired by the most recent processing in S102 to S104.

As processing in S105, the re-modulation processing unit 214 starts an amplitude modulation of the optical signal L2 illustrated in FIG. 2 by second data and the like for which a modulation count has been increased by one by the most recent processing in S103-2.

The re-modulation processing unit 214 performs, as processing in S106, determination regarding whether a new modulation optical signal is detected as the optical signal L2.

When a determination result by the processing in S106 is no, the re-modulation processing unit 214 continues the amplitude modulation started by the processing in S105, as processing in S107. Unless the determination result by the processing in S106 becomes yes, the re-modulation processing unit 214 repeats processing in S106 to S109 until the amplitude modulation is completed and a determination result by processing in S109 becomes yes.

On the other hand, when the determination result by the processing in S106 becomes yes, the re-modulation processing unit 214 stops the amplitude modulation started by the most recent processing in S105, as processing in S108.

The re-modulation processing unit 214 repeats the processing in S102 to S104, and thereby acquires second data and the like from a new modulation optical signal detected by the most recent processing in S106.

Thereafter, the re-modulation processing unit 214 repeats the processing in S105 to S109, and thereby performs an amplitude modulation by second data and the like. In this instance, the re-modulation processing unit 214 first performs an amplitude modulation by second data and the like for which an amplitude modulation has been stopped by the most recent processing in S108, and, when the amplitude modulation is completed, then performs an amplitude modulation by acquired second data and the like.

However, when the determination result by the processing in S106 has become yes during the amplitude modulation, the re-modulation processing unit 214 performs the processing in S108. Regarding the modulation optical signal of which detection has been determined by the most recent processing in S106, the re-modulation processing unit 214 acquires second data and the like by repeating the processing in S103 and S104. Regarding second data and the like for which an amplitude modulation has not reached completion, the re-modulation processing unit 214 performs an amplitude modulation by repeating the processing in S106 to S109 in order from the old second data and the like.

When the above-described amplitude modulation reaches completion, and a determination result by S109 becomes yes, the re-modulation processing unit 214 performs, as processing in S110, determination regarding whether to end the processing illustrated in FIG. 6. The re-modulation processing unit 214 performs the determination by, for example, determining presence or absence of input of end information from outside.

When a determination result by the processing in S110 is yes, the re-modulation processing unit 214 ends the processing illustrated in FIG. 6. On the other hand, when a determination result by the processing in S110 is no, the re-modulation processing unit 214 again performs the processing in S101.

Figure 7:
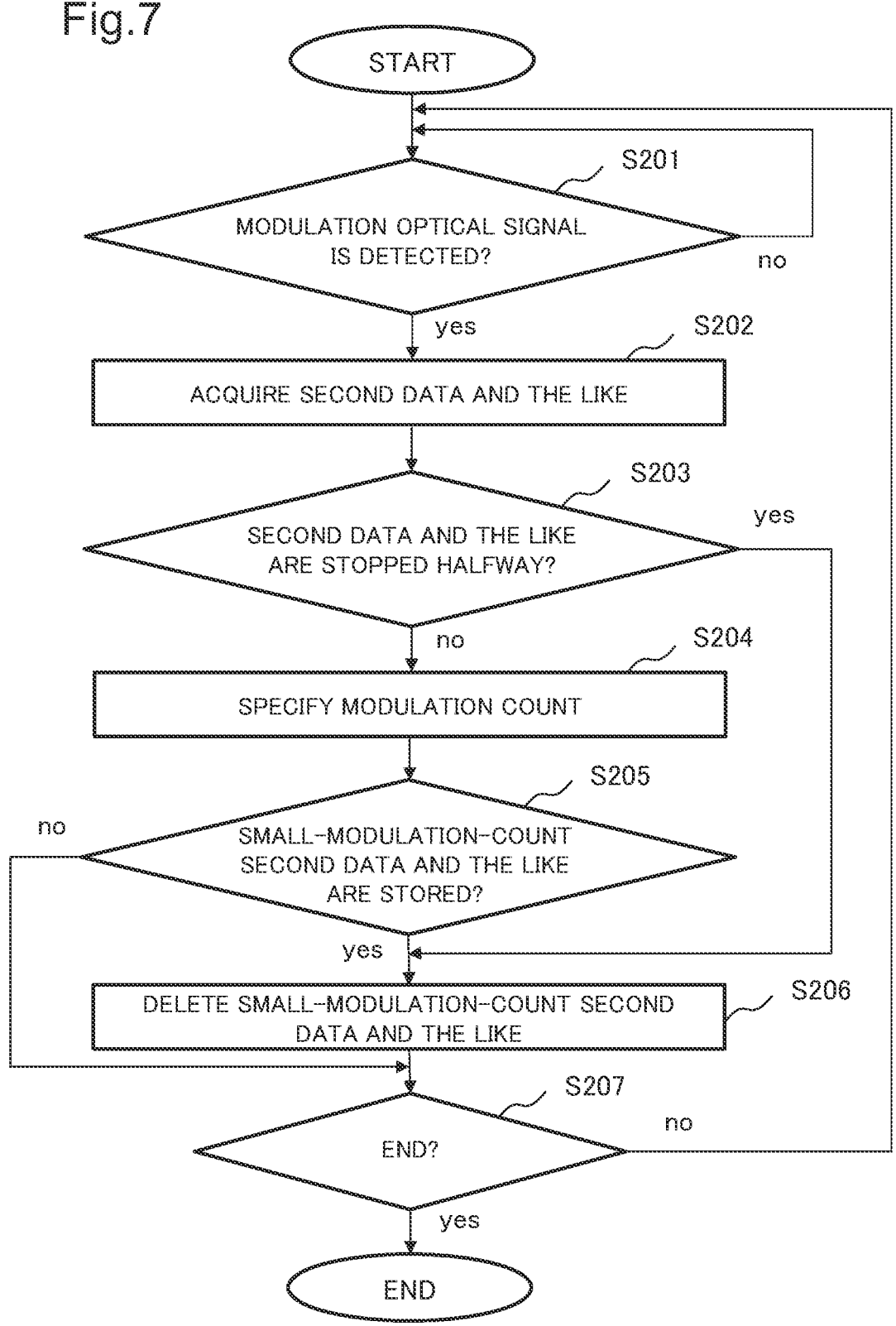
FIG. 7 is a conceptual diagram illustrating a processing flow example of processing performed by a second data reception processing unit.

FIG. 7 is a conceptual diagram illustrating a processing flow example of processing performed by the second data reception processing unit 314 illustrated in FIG. 5.

The second data reception processing unit 314 starts processing illustrated in FIG. 7 by, for example, input of start information from outside.

In this case, the second data reception processing unit 314 first performs, as processing in S201, determination regarding whether a modulation optical signal has been detected. The second data reception processing unit 314 monitors a fluctuation of amplitude of the optical signal L3 within a most recent predetermined period, and detects that the optical signal L3 is a modulation optical signal when the fluctuation is present.

When a determination result by the processing in S201 is no, the second data reception processing unit 314 again performs the processing in S201, and waits for the determination result to become yes.

When a modulation optical signal arrives, and the determination result by the processing in S201 becomes yes, the second data reception processing unit 314 starts acquisition of second data and the like from the modulation optical signal by demodulation of the modulation optical signal, as processing in S202. The second data reception processing unit 314 causes the storage unit 215 illustrated in FIG. 4 to sequentially store the acquired second data and the like.

As processing in S203, the second data reception processing unit 314 performs, regarding the modulation optical signal detected by the processing in S201, determination regarding whether an amplitude modulation is stopped halfway. For example, when modulation optical signal end information is absent in a modulation optical signal, the second data reception processing unit 314 determines that the modulation optical signal is a modulation optical signal for which an amplitude modulation has been stopped halfway. For example, when modulation optical signal end information is present in a modulation optical signal, the second data reception processing unit 314 determines that the modulation optical signal is not a modulation optical signal for which an amplitude modulation has been stopped halfway.

When a determination result by the processing in S203 is no, the second data reception processing unit 314 performs processing in S204. On the other hand, when the determination result by the processing in S203 is yes, the second data reception processing unit 314 performs processing in S206.

When performing the processing in S204, the second data reception processing unit 314 specifies, as the processing, the previously described modulation count included in the second data and the like acquired by the processing in S202. As previously described, the modulation count is included in, for example, modulation optical signal end information.

The second data reception processing unit 314 performs, as processing in S205, determination regarding whether the storage unit 315 stores the previously described small-modulation-count second data and the like being second data and the like which includes a modulation count smaller than a modulation count included in the second data and the like acquired by the processing in S202 and in which second data are equal.

When a determination result by the processing in S205 is yes, the second data reception processing unit 314 causes the storage unit 315 to delete the small-modulation-count second data and the like which the storage unit 315 is determined to store by the processing in S205, as processing in S206. This is intended to avoid redundant holding of the second data and the like in which second data are the same, by deleting small-modulation-count second data and the like, as previously described.

On the other hand, when the determination result by the processing in S205 is no, the processing in S206 is skipped, and processing in S207 is performed without deleting small-modulation-count second data and the like.

When performing the processing in S207, the second data reception processing unit 314 performs, as the processing, determination regarding whether to end the processing illustrated in FIG. 7. The second data reception processing unit 314 performs the processing by, for example, determining presence or absence of input of end information from outside.

When a determination result by the processing in S207 is yes, the second data reception processing unit 314 ends the processing illustrated in FIG. 7. On the other hand, when the determination result by the processing in S207 is no, the second data reception processing unit 314 again performs the processing in S201.

Advantageous Effect

In a modulation communication system according the present example embodiment, a re-modulation device demodulates a first modulation optical signal sent toward a demodulation reception device by a modulation transmission device by amplitude-modulating an input optical signal, and acquires second data and the like included in the first modulation optical signal. The re-modulation device sends, to the demodulation reception device, a second modulation optical signal amplitude-modulated by the acquired second data and the like including second data, for a non-amplitude-modulated part of the input optical signal. In this way, the modulation communication system performs an amplitude modulation with second data and the like including second data acquired by the re-modulation device, and thereby recovers a modulation degree in an optical signal amplitude-modulated by second data arriving at the demodulation reception device. Thus, the modulation communication system is capable of further elongating a communicable distance of an amplitude-modulated optical signal in an optical cable.

Figure 8:
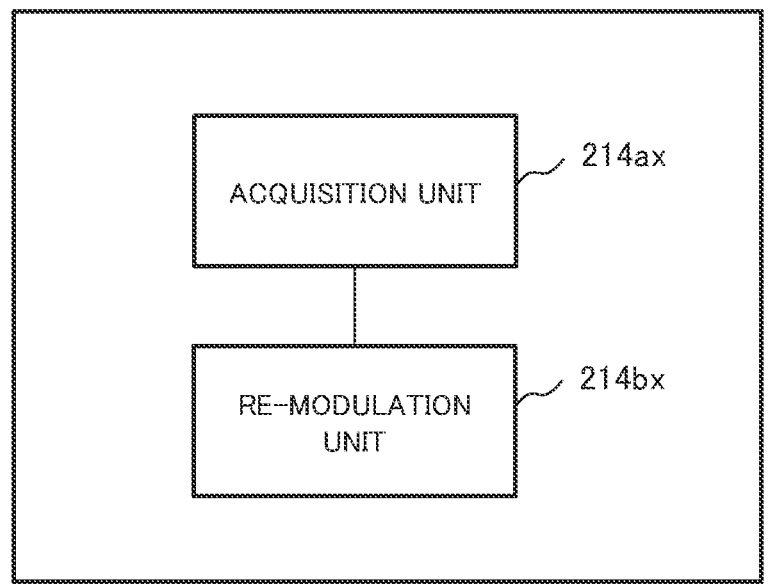
FIG. 8 is a block diagram illustrating a minimum configuration of a re-modulation device according to an example embodiment.

FIG. 8 is a block diagram illustrating a configuration of a re-modulation device 200x being a minimum configuration of a re-modulation device according to the example embodiment. The re-modulation device 200x includes an acquisition unit 214ax and a re-modulation unit 214bx.

The acquisition unit 214ax acquires second data that are sent to a demodulation reception device by a modulation transmission device, from a first modulation optical signal derived by subjecting an optical signal to a first amplitude modulation by the second data.

When determining passing of the first modulation optical signal, the re-modulation unit 214bx sends, to the demodulation reception device, a second modulation optical signal derived by subjecting the input optical signal to a second amplitude modulation by the second data.

The re-modulation device 200x acquires second data from an arriving first modulation optical signal, and re-subjects an optical signal after passing of the first modulation optical signal to an amplitude modulation by the second data. Thus, even when a modulation degree of the arriving first modulation optical signal is decreased, the re-modulation device 200x can recover a modulation degree in a second modulation optical signal that has been re-subjected to an amplitude modulation.

Thus, the re-modulation device 200x is capable of further elongating a communicable distance of an amplitude-modulated optical signal in an optical cable.

Thus, the re-modulation device 200x brings about an advantageous effect described in the paragraph of Advantageous Effects of Invention by the configuration described above.

Herein, the re-modulation device 200x is, for example, the re-modulation device 200 illustrated in FIG. 2 or 4. The acquisition unit 214ax is, for example, a combination of the optical coupler 211, the optical reception unit 212, and the A/D converter 213, which are illustrated in FIG. 4, a part of the re-modulation processing unit 214 that performs the processing in S102 and S104 illustrated in FIG. 6, and the storage unit 215. The re-modulation unit 214bx is, for example, a combination of a part of the re-modulation processing unit 214, illustrated in FIG. 4, that performs the processing in S103, S105, and S107 illustrated in FIG. 6, and the storage unit 215, the drive unit 230, and the optical amplifier 220 which are illustrated in FIG. 4. The optical signal is, for example, the optical signal L1 illustrated in FIG. 2. The modulation transmission device is, for example, the modulation transmission device 100 illustrated in FIG. 2 or 3. The demodulation reception device is, for example, the demodulation reception device 300 illustrated in FIG. 2 or 5. The second data are, for example, the previously described second data. The first modulation optical signal is, for example, the previously described first modulation optical signal. The second modulation optical signal is, for example, the previously described second modulation optical signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, a configuration of elements illustrated in each drawing is one example to help understanding the present invention, and the present invention is not limited to the configuration illustrated in each of the drawings.

The whole or part of the example embodiments disclosed above can be described as, but not limited to, the following supplementary notes.

(Supplementary Note 1)

A re-modulation device including:

an acquisition unit that acquires second data being sent to a demodulation reception device by a modulation transmission device from a first modulation optical signal derived by subjecting an optical signal to a first amplitude modulation by the second data; and a re-modulation unit that sends, to the demodulation reception device, a second modulation optical signal derived by subjecting input optical signal to a second amplitude modulation by the second data, when determining passing of the first modulation optical signal.

(Supplementary Note 2)

The re-modulation device according to supplementary note 1, wherein the optical signal includes first data being sent to a reception device by a transmission device.

(Supplementary Note 3)

The re-modulation device according to supplementary note 1 or 2, wherein the second amplitude modulation is stopped when the amplitude-modulated optical signal arrives during the second amplitude modulation.

(Supplementary Note 4)

The re-modulation device according to any one of supplementary notes 1 to 3, wherein the re-modulation unit performs the second amplitude modulation by the second data and additional data being data added to the second data, the additional data include modulation count data being data representing a count of amplitude-modulating of the optical signal by the second data, and the re-modulation unit updates the modulation count data.

(Supplementary Note 5)

The re-modulation device according to supplementary note 4, wherein the additional data are at least any one of second data start data representing start of the second data and second data end data representing end of the second data.

(Supplementary Note 6)

A demodulation reception device including a second acquisition unit that acquires second data from a second modulation optical signal derived by subjecting an optical signal to a second amplitude modulation by the second data, wherein, when a re-modulation device determines passing of a first modulation optical signal derived by subjecting an optical signal to a first amplitude modulation by the second data being sent to the demodulation reception device by a modulation transmission device, the second modulation optical signal is derived by subjecting, to a second amplitude modulation, the optical signal being input to the re-modulation device by the second data acquired from the first modulation optical signal by the re-modulation device.

(Supplementary Note 7)

The demodulation reception device according to supplementary note 6, further including a first discard processing unit that discards the second data acquired by the second acquisition unit, when determining that second data end information representing end of the second data is not added after the second data included in the first modulation optical signal.

(Supplementary Note 8)

The demodulation reception device according to supplementary note 6 or 7, wherein the second acquisition unit performs acquisition of the second data and additional data being data added to the second data from the second modulation optical signal, and the additional data include modulation count data being data representing a modulation count of amplitude-modulating of the optical signal by the second data, the demodulation reception device further including a second discard processing unit that discards the second data when determining that the second data, to which the additional data including the modulation count data for the modulation count being smaller than the modulation count of the most recently acquired modulation count data are added, are already stored.

(Supplementary Note 9)

The demodulation reception device according to any one of supplementary notes 4 to 8, wherein the optical signal includes first data being sent to a reception device by a transmission device.

(Supplementary Note 10)

The demodulation reception device according to any one of supplementary notes 4 to 9, wherein the re-modulation device stops the second amplitude modulation when the amplitude-modulated optical signal arrives during the second amplitude modulation.

(Supplementary Note 11)

A modulation transmission device sending a first modulation optical signal derived by subjecting an optical signal to a first amplitude modulation by second data being sent to a demodulation reception device by a modulation transmission device, to a re-modulation device that subjects, to a second amplitude modulation, the optical signal being input to the re-modulation device by the second data acquired from the first modulation optical signal by the re-modulation device, when determining passing of the first modulation optical signal.

(Supplementary Note 12)

A modulation communication system including:

a re-modulation device that acquires second data being sent to a demodulation reception device by a modulation transmission device, from a first modulation optical signal derived by subjecting an optical signal to a first amplitude modulation by the second data, and sends, to the demodulation reception device, a second modulation optical signal derived by subjecting input optical signal to a second amplitude modulation by the second data, when determining passing of the first modulation optical signal;

the modulation transmission device; and the demodulation reception device.

(Supplementary Note 13)

An optical communication system including a modulation communication system including: a re-modulation device that acquires second data being sent to a demodulation reception device by a modulation transmission device, from a first modulation optical signal derived by subjecting an optical signal to a first amplitude modulation by the second data, and sends, to the demodulation reception device, a second modulation optical signal derived by subjecting input optical signal to a second amplitude modulation by the second data, when determining passing of the first modulation optical signal; the modulation transmission device; and the demodulation reception device, wherein the optical signal includes first data being sent to a reception device by a transmission device, the optical communication system further including the transmission device and the reception device.

(Supplementary Note 14)

A re-modulation method including:

acquiring second data being sent to a demodulation reception device by a modulation transmission device from a first modulation optical signal derived by subjecting an optical signal to a first amplitude modulation by the second data; and sending, to the demodulation reception device, a second modulation optical signal derived by subjecting input optical signal to a second amplitude modulation by the second data, when determining passing of the first modulation optical signal.

(Supplementary Note 15)

A re-modulation program causing a computer to execute:

processing of acquiring second data being sent to a demodulation reception device by a modulation transmission device, from a first modulation optical signal derived by subjecting an optical signal to a first amplitude modulation by the second data; and processing of sending, to the demodulation reception device, a second modulation optical signal derived by subjecting input optical signal to a second amplitude modulation by the second data, when determining passing of the first modulation optical signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-138564, filed on Jul. 29, 2019, the disclosure of which is incorporated herein in its entirety by reference.

REFERENCE SIGNS LIST

100 Modulation transmission device
102 Second data transmission processing unit
103, 220 Optical amplifier
104, 230 Drive unit
200, 200$x$ Re-modulation device
211, 311 Optical coupler
212, 312 Optical reception unit
213, 313 A/D converter
214 Re-modulation processing unit
214$ax$ Acquisition unit
214$bx$ Re-modulation unit
215, 315 Storage unit
314 Second data reception processing unit
300 Demodulation reception device
600 Transmission device
700 Reception device
900 Optical communication system
901, 902, 903, 904 Optical cable

What is claimed is:

1. A re-modulation device comprising:
an acquisition circuit configured to acquire data being sent to a demodulation reception device by a modulation transmission device, from a first modulation optical signal derived by subjecting an optical signal to a first amplitude modulation by the data; and
a re-modulation circuit configured to, when determining to pass the first modulation optical signal, send to the demodulation reception device a second modulation optical signal derived by subjecting the optical signal to a second amplitude modulation by the data and by additional data added to the data that represents an amplitude-modulation count of the optical signal, and update the amplitude-modulation count.

2. The re-modulation device according to claim 1, wherein the data is second data, and the optical signal includes first data being sent to a reception device by a transmission device.

3. The re-modulation device according to claim 1, wherein the second amplitude modulation is stopped when a new amplitude-modulated optical signal arrives during the second amplitude modulation.

4. The re-modulation device according to claim 1, wherein
the additional data further represents either or both a start of the data and an end of the data.

5. The re-modulation device according to claim 2, wherein the second amplitude modulation is stopped when a new amplitude-modulated optical signal arrives during the second amplitude modulation.

6. A demodulation reception device comprising:
a acquisition circuit configured to acquire data from a second modulation optical signal derived by subjecting an optical signal to a second amplitude modulation by the data, and to acquire from the second modulation optical signal additional data added to the data that represents an amplitude-modulation count of the optical signal; and
a discard processing circuit to discard the data when determining that the data matches previously acquired data and that the amplitude-modulation count represented by the additional data added to the data is smaller than an amplitude-modulation count represented by additional data added to the previously acquired data, wherein
when a first modulation optical signal is determined to be passed, where the first modulation signal is derived by subjecting the optical signal to a first amplitude modulation by the second data being sent to the demodulation reception device by a modulation transmission device, the second modulation optical signal is derived by subjecting the optical signal to a second amplitude modulation by the second data and by the additional data.

7. The demodulation reception device according to claim 6, wherein the discard processing circuit is a second discard processing circuit, the demodulation reception circuit further comprising:

a first discard processing circuit configured to discard the data acquired by the second acquisition circuit, when determining that the second data added to the data does not represent an end of the data.

8. The demodulation reception device according to claim 6, wherein the data is second data, and the optical signal includes first data being sent to a reception device by a transmission device.

9. The demodulation reception device according to claim 6, wherein the the second amplitude modulation is stopped when a new amplitude-modulated optical signal arrives during the second amplitude modulation.

10. The demodulation reception device according to claim 7, wherein the data is second data, and the optical signal includes first data being sent to a reception device by a transmission device.

11. The demodulation reception device according to claim 7, wherein the the second amplitude modulation is stopped when a new amplitude-modulated optical signal arrives during the second amplitude modulation.

12. The demodulation reception device according to claim 8, wherein the the second amplitude modulation is stopped when a new amplitude-modulated optical signal arrives during the second amplitude modulation.

\* \* \* \* \*